United States Patent [19]

Shibayashi et al.

[11] Patent Number: 4,755,114
[45] Date of Patent: Jul. 5, 1988

[54] SEALED TYPE SCROLL COMPRESSOR WITH WIRE MESH OIL SEPARATING MEMBER

[75] Inventors: Masao Shibayashi, Shimizu; Katsuaki Kikuchi, Tsuchiura; Naoshi Uchikawa, Shimizu; Yasuro Ohishi, Fujieda; Akira Murayama, Shimizu; Hiroaki Kuno, Shimizu; Kiyoshi Fukatsu, Shimizu; Minoru Tomono, Shimizu, all of Japan

[73] Assignee: Hitachi, Ltd., Tokyo, Japan

[21] Appl. No.: 15,036

[22] Filed: Feb. 17, 1987

[30] Foreign Application Priority Data

Mar. 3, 1986 [JP] Japan .................................. 61-43972

[51] Int. Cl.$^4$ ...................... F04C 18/04; F04C 29/02; B01D 39/10; B01D 45/02
[52] U.S. Cl. .................. 418/55; 418/DIG. 1; 55/435; 55/525; 55/DIG. 45
[58] Field of Search ............... 418/55, 97–100, 418/DIG. 1; 55/435, 525, DIG. 45

[56] References Cited

U.S. PATENT DOCUMENTS 3,242,562 3/1966 Kraft ...................... 55/525
4,091,638 5/1978 Mitch ...................... 418/DIG. 1
4,545,747 10/1985 Tamura et al. ...................... 418/55

FOREIGN PATENT DOCUMENTS

| 59-7793 | 1/1984 | Japan | 418/55 |
| 59-176494 | 10/1984 | Japan | 418/DIG. 1 |
| 60-243389 | 12/1985 | Japan | 418/DIG. 1 |
| 60-243390 | 12/1985 | Japan | 418/DIG. 1 |
| 2052284 | 1/1981 | United Kingdom | 55/DIG. 45 |

Primary Examiner—John J. Vrablik
Attorney, Agent, or Firm—Antonelli, Terry & Wands

[57] ABSTRACT

A sealed scroll compressor comprises a scroll compressor section, an electric motor, a sealed container, an oil storage, a fixed and orbiting scroll members, and a wire mesh member for improvement of oil separation in refrigerant gas. A shell portion of said sealed container is lined annularly with the wire mesh member and the gas containing oil is adapted to flow downwardly along the wire mesh member. When the gas flows downwardly, the oil sticks to the wire mesh member and is separated from the gas. The oil collected on the wire mesh member drops down into the oil storage. The gas from which the oil is separated is, after that, discharged out of the compressor.

16 Claims, 10 Drawing Sheets

SEALED TYPE SCROLL COMPRESSOR WITH WIRE MESH OIL SEPARATING MEMBER

BACKGROUND OF THE INVENTION

In a sealed type scroll compressor, for example, as disclosed in U.S. Pat. No. 4,545,747, refrigerant gas compressed by a compression mechanism portion once passes the outer peripheral portion of a motor stator. After oil is separated from the gas at the lower portion of a chamber, the gas goes up through the outer peripheral portion of the motor stator again to an upper space of a motor chamber. Further the gas is introduced to the outside via a discharge pipe, and thus a gas flow passage is defined. Such a directional conversion function of the gas flow passage within the motor chamber has its limit in oil separating efficiency in a sealed container. Accordingly, the amount of oil flowing out from the discharge pipe of the compressor, so-called, the oil rising amount (oil discharge amount) is increased.

Particularly, in the case where the scroll compressor is operated by an inverter drive, the above-described oil rising phenomenon becomes conspicuous when the rotational speed of the compressor is increased. There is a fear that an increase of the oil rising amount of the compressor decreases the efficiency and reliability of an overall refrigerating cycle (for example, a decrease of heat exchanging efficiency of a heat exchanger, an increase of pressure loss of pipes and so on), to say nothing of the reliability of the compressor itself. Also, a reduction in size and weight of the compressor as a whole is an important problem in addition to the problem regarding the above-mentioned oil rising amount. The outer dimensions of the sealed container, especially its outer diameter is therefore decreased as much as possible for reducing its size and weight. Succeedingly, a gap between the outer peripheral portion of the motor stator and the inner wall surface of a body portion of the sealed container is obliged to be narrow. For example, the size of such a gap in an air-conditioning scroll compressor of 2.2 kw–3.75 kw is approximately 2 mm. If the gap size at the stator outer peripheral portion is small as above, oil becomes more easily stored at the stator upper portion from the viewpoint of oil separation, and thus stored oil is blown up by the refrigerant gas to result in promotion of the oil rising phenomenon. For this reason, it is important to enhance the function of the oil's flowing down in the narrow gap at the outer periphery of the motor stator in order to facilitate the oil separation within the sealed container.

SUMMARY OF THE INVENTION

It is an object of the present invention to provide a sealed type scroll compressor in which oil in a sealed container is separated efficiently and the oil is prevented from flowing out of the compressor together with a discharge gas.

In order to attain the above-described object, the present invention provides a scroll compressor construction in which a lower chamber of a sealed container is lined annularly on its inner wall surface with a rectangular wire mesh member having an appropriate axial length, and in which the surface area of the inner wall is so increased by means of the finely perforated wire mesh member as to enhance an oil capture function. The captured on the wire mesh surface changes into the form of an oil film by its surface tension so that the oil is prevented from blowing up by a discharge gas flow along the inner wall of the sealed container and from being accompanied by the discharge gas, and the wire mesh member serves also as a guide passage through which the oil gathered on the wire mesh member flows down.

More specifically, oil is contained in the discharge gas which is discharged from a discharge port of the compressor into an upper chamber of the sealed container. The discharge gas is then introduced into an upper portion of a motor chamber via gas passageways bored in a frame. At this time, since the discharge gas flows downwardly along the wire mesh member from the above gas passageways, the oil adheres to the wire mesh member and is separated from the gas. Because the wire mesh member is formed in fine meshes so as to increase the surface area of the wall surface with which the discharge gas contacts, the oil-adhering function is carried out positively. Also, the oil adhering to the wire mesh member forms an oil film by its surface tension as the wire mesh member is finely perforated, and the oil once adhering to the wire mesh member is not taken away by the gas flow. Further, the above adhering oil flows down easily along a flowing-down passage of the wire mesh member and drops down into a lower oil storage of the container.

According to the present invention, the oil separating function within the sealed container is promoted, and the separated oil smoothly flows down by means of the wire mesh member and is not taken away again by the discharge gas. The oil rising amount of the compressor is thus reduced and an effect of improving reliability of the compressor is obtained.

DETAILED DESCRIPTION OF THE EMBODIMENTS

Figure 1:
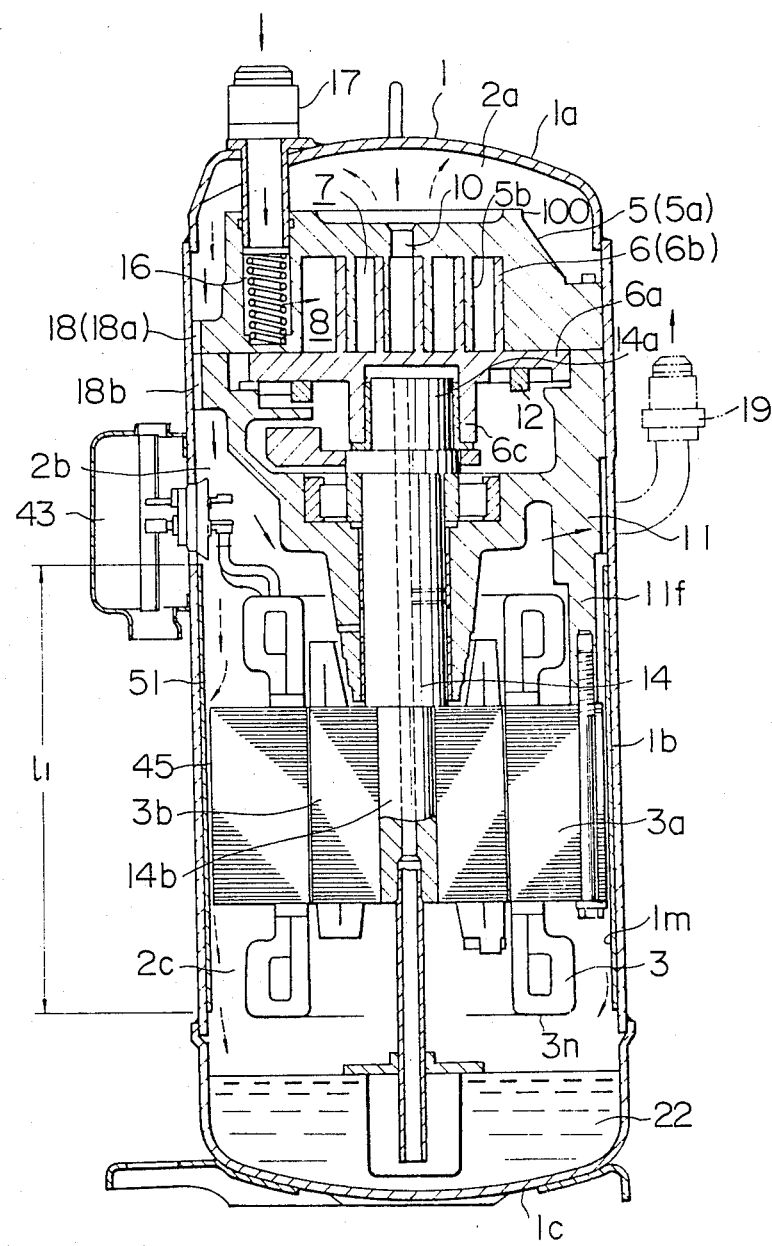
FIG. 1 is a vertical sectional view showing a sealed type scroll compressor according to one embodiment of the invention.

Embodiments of the present invention will be described hereinafter with reference to the accompanying drawings. FIG. 1 shows an overall arrangement of a sealed type scroll compressor according to one embodiment of the invention.

In FIG. 1, there are contained a compressor section 100 at an upper portion and an motor section 3 at a lower portion within a sealed container 1. The interior of the sealed container 1 is separated into an upper chamber 2a and a motor chamber.

In the compressor section 100, a fixed scroll member 5 and an orbiting scroll member 6 are so engaged with each other as to define a compression chamber (a sealed space) 7 therebetween. The fixed scroll member 5 comprises a disc-like end plate 5a and a wrap 5b formed in upstanding position along an involute or similar curve on the end plate, and includes a discharge port 10 at the center portion of the member and a suction port 16 in the periphery thereof. The orbiting scroll member 6 comprises a disc-like end plate 6a, a wrap 6b formed on the end plate in upstanding position and in the same configuration as that of the wrap of the fixed scroll member, and a boss 6c formed on the opposite surface of the end plate from the wrap. A bearing portion is formed at the center portion of a frame 11 for supporting a rotating shaft 14, and an eccentric shaft 14a at the top of the rotating shaft is inserted into the above boss 6c for orbiting movement. Also, the fixed scroll member 5 is secured to the frame 11 by means of a plurality of bolts, while the orbiting scroll member 6 is supported by the frame 11 through an Oldham mechanism 12 which comprises an Oldham ring and Oldham key, so that the orbiting scroll member 6 may be moved in orbiting motion with respect to the fixed scroll member 5 without rotation about its own axis. The rotating shaft 14 is integrally provided at its lower portion with a motor shaft 14b securely fitted in a rotor 3b to be directly coupled with the motor section 3. The suction port 16 of the fixed scroll member 5 is connected with a suction pipe 17 perpendicularly penetrating through the sealed container 1. The upper chamber 2a to which the discharge port 10 opens is communicated with an upper motor chamber 2b by means of passageways 18a, 18b. The upper motor chamber 2b is in communication with a lower motor chamber 2c through a passage 45 which is defined between a motor stator 3a and the side wall of the sealed container 1. And the upper motor chamber 2b leads to a discharge pipe 19 which penetrates through the sealed container 1.

Reference numeral 11f designates a frame pedestal portion for securing the motor 3 to the frame. Reference numerals 43 and 22 designate a hermetic terminal part and an oil storage at the bottom of the sealed container, respectively. Further, arrows of the solid line in the drawing indicate the flow direction of refrigerant gas and arrows of the dotted line show the flow direction of oil.

The above-described sealed container 1 is constituted by an upper end plate 1a, a shell portion 1b and a lower end plate 1c. The shell portion 1b is lined annularly along its inner wall 1m with a rectangular wire mesh member 51 which has a length $l_1$ and extends to the outer periphery of a lower coil end portion 3n of the stator 3a of the motor 3. This wire mesh member comprises a woven wire mesh of a fine metallic wire, and as a type of the woven wire mesh any one of the following types may be used: plain-weave wire mesh; twilled-weave wire mesh; and dutch-weave wire mesh, which are standardized by JIS (Japanese Industrial Standard) G3555. From the viewpoint of oil separation, however, the dutch-weave type wire mesh is preferably used, since the mesh is fine so as to maximize the surface area thereof. As concerns cost, the plain-weave type wire mesh is most appropriate.

Figure 3:
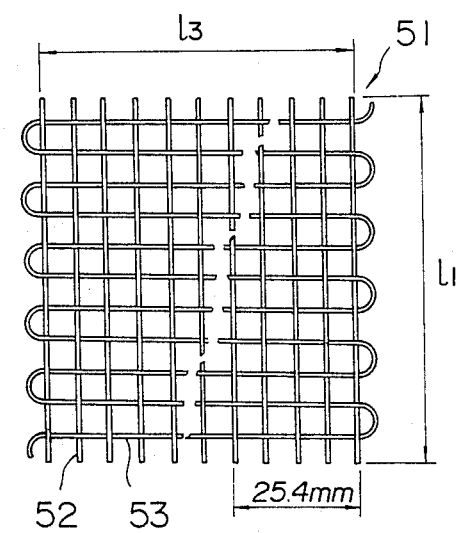
FIG. 3 is a detailed view of a wire mesh member in the embodiment of FIG. 1.

FIG. 3 is a plan view showing the plain-weave type wire mesh in an enlarged scale. In a wire mesh 51, each longitudinal wire 52 and each transversal wire 53 intersect with each other at a constant interval.

Figure 2:
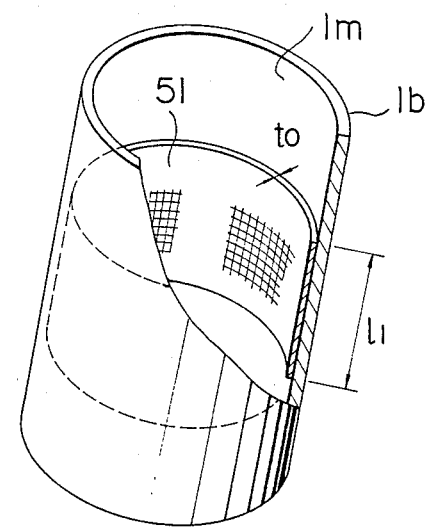
FIG. 2 is a partial perspective view of a shell portion of a sealed container in the embodiment of FIG. 1.

It is suitable that the pitch of the mesh is within the range from 20 to 150 meshes by means of the mesh-indication (a number of meshes within the length of 24.5 mm) with respect to both longitudinal and transversal wires, and that the diameter of each wire is within the range from 0.1 mm to 0.5 mm. Further, the size of approximately 0.2 mm to 1.0 mm is suitable for the thickness t0 of the wire mesh member 51 when the same is lined in a single layer from the viewpoint of practicability. The shell portion of the sealed container is lined annularly along the surface of the inner wall 1m with the wire mesh member 51, as shown in FIG. 2. The axial length $l_1$ of the aforesaid member 51 depends on the size of the upper and lower motor chambers 2b, 2c, and in the above-described embodiment the member is formed to have the length $l_1$ extending from the lower edge vicinity of the frame 11 to a lower portion of the motor stator 3a.

Spot-welding is practical for attaching the wire mesh member 51 to the inner wall 1m of the shell portion of the sealed container. Reference mark $l_3$ in the drawing represents the circumferential length of the wire mesh member.

Description will be made on the function of the wire mesh on the inner wall of the sealed container in the sealed scroll compressor having the above-described structure.

Gas which has flown into the sealed chamber 7 through the suction pipe 17 and a suction chamber 8 is compressed by means of the orbiting movement of the orbiting scroll member 6, and is discharged from the discharge port 10 into the upper chamber 2a. The discharged gas contains an oil and is introduced into the upper motor chamber 2b through the passageways 18a, 18b. At this time, since the discharged gas flows downwardly from the passageway 18b along the wire mesh member 51 of the shell inner wall of the sealed container, the oil in the gas sticks or adheres to the wire mesh member 51 to be separated from the gas. The wire mesh member 51 is formed in a fine mesh and the surface area of the inner wall with which the discharged gas contacts is increased by means of the above wire mesh member 51, so that the adhering function of the oil is effected positively and effectively. Then, the discharged gas comes into collision with the stator 3a of the motor and is changed in flow direction so as to flow around the outer periphery of the upper coil end 3c. Subsequently, the gas is discharged out of the compressor through the discharge pipe 19.

As the mesh of the above wire mesh member 51 is fine, the oil adhering to the member 51 forms an oil film by its surface tension so that the oil having once captured by the wire mesh member 51 is not taken away again by the gas flow.

The thus captured oil flows down through a flowing-down guide way of the wire mesh member 51 under gravity and drops down into the oil storage 22 in the lower portion of the container.

In the above-described embodiment, the wire mesh member 51 has a preferable length $l_1$ extending to the lower portion of the stator 3a. Though it is preferable to increase the axial length of the mesh member as much as possible so as to enlarge the surface area thereof (oil sticking area) for effecting the oil sticking function, a sufficient function and result for practical use can be attained as far as the lower edge of the wire mesh member extends to the upper end of the motor stator 3a.

Figure 4:
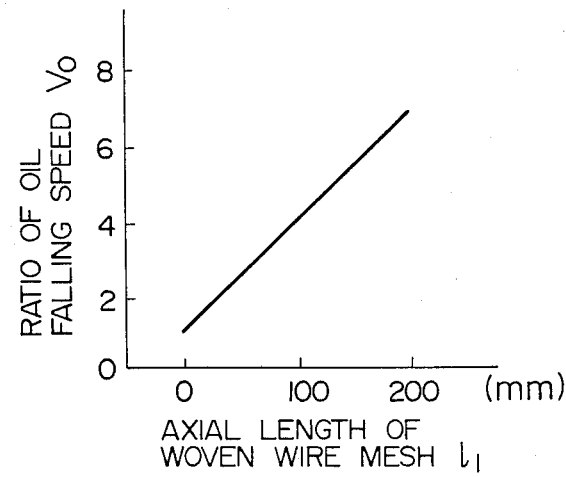
FIG. 4 is a diagram showing a relation between an axial length of the wire mesh member of FIG. 3 and flowing-down speed of oil.

FIG. 4 is a diagram showing the relation between the size of the axial length $l_1$ of the wire mesh member 51 and the oil falling speed, which result has been obtained from an experiment conducted by the inventors. The experiment has been conducted with respect to a sealed container which has an inner diameter of 167 mm and whose wire mesh member is of the plain-weave type and 100-mesh. In the diagram, the axes of abscissa and ordinate respectively indicate speed ratio Vo and the axial length $l_1$, and the speed ratio Vo is non-dimensional value on the basis of oil falling speed in a construction in which the wire mesh member is not provided.

Meanwhile, the oil falling speed is a speed at which oil falls downwardly when the oil is flown on the inner wall surface of the sealed container. It will be appreciated from FIG. 4 that the speed at which the oil falls downwardly along the inner wall surface of the sealed container is increased at $l_1$ of 200 mm about seven times owing to the lining of the wire mesh member on the inner wall of the sealed container, as shown in diagram.

Figure 5:
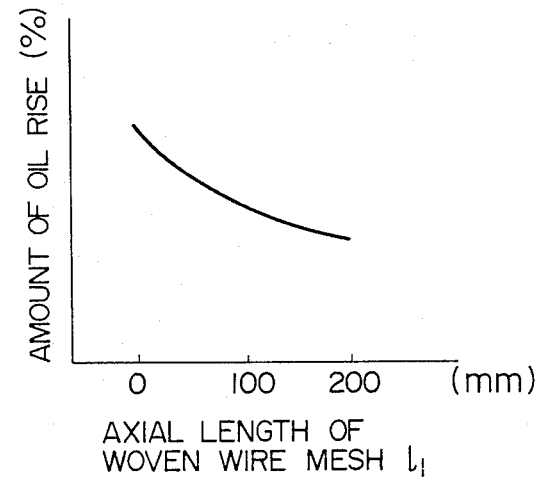
FIG. 5 is a diagram showing a relation between the axial length of the wire mesh member of FIG. 3 and an oil rising amount.

FIG. 5 is a diagram of experimental results which show the oil rising amount in the compressor of the embodiment of FIG. 1 having the above-mentioned characteristics when the length $l_1$ of the wire mesh member 51 is varied. The oil rising amount and the length $l_1$ of the wire mesh member are indicated respectively on the axes of ordinate and abscissa. The oil rising amount varies according to the change of the length $l_1$ as the curve shown in the diagram, and the oil rising amount is decreased as the length $l_1$ is increased.

Figure 6:
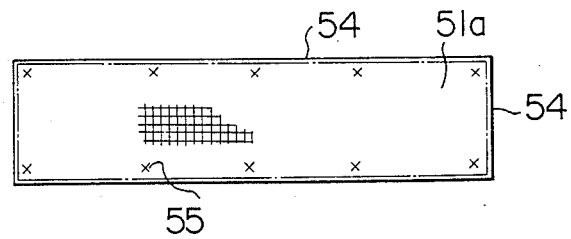
FIG. 6 is a development view showing another example of a wire mesh member usable in the invention.
Figure 7:
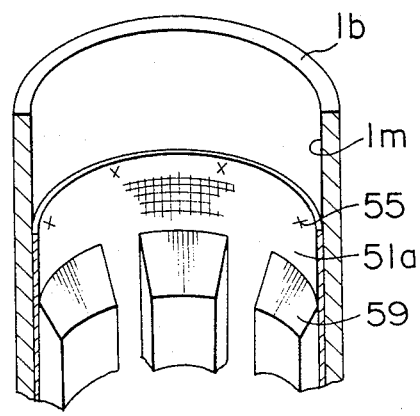
FIG. 7 is a vertical sectional view in which the sealed container is lined with the wire mesh member of FIG. 6.

FIG. 6 shows another example of the wire mesh member. The wire mesh member 51a of this example is so constructed to be prevented from fraying that the longitudinal and transversal wires thereof are connected with each other at a periphery 54 as shown in the drawing by means of a narrow seamless welding. Also, as shown in FIG. 7, spot-welding points 55 for attaching the wire mesh member 51a to the inner wall 1m of the sealed container are disposed in the periphery 54 of the wire mesh member 51 at appropriate intervals as shown by x in the drawing.

The above spot welding is successively carried out with an automatic welder under the following condition. The wire mesh member 51a is kept in close contact with the inner wall 1m of the sealed container by being supported at its center portion except the positions to be spot-welded with biasing means 59, and the sealed container 1b and the biasing means 59 are rotated synchronously.

Figure 8:
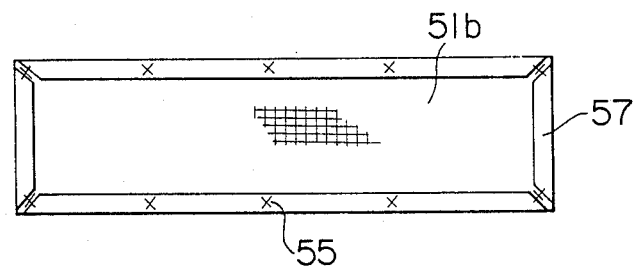
FIG. 8 is a development view showing still another example of a wire mesh member usable in the invention.

FIG. 8 shows still another example of the wire mesh member. The wire mesh member 51b of this example is folded to the rear side at its periphery by a narrow width. The drawing shows the rear view of the wire mesh member after the periphery thereof has been folded. The folded portion 57 is held against the inner wall surface of the sealed container to be spot-welded at portions 55. In this example, fraying of the mesh member is prevented by means of the periphery thereof folded to the rear side.

Figure 9:
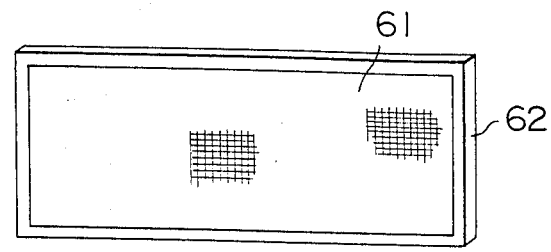
FIG. 9 is a development view showing further another example of a wire mesh member usable in the invention.
Figure 10:
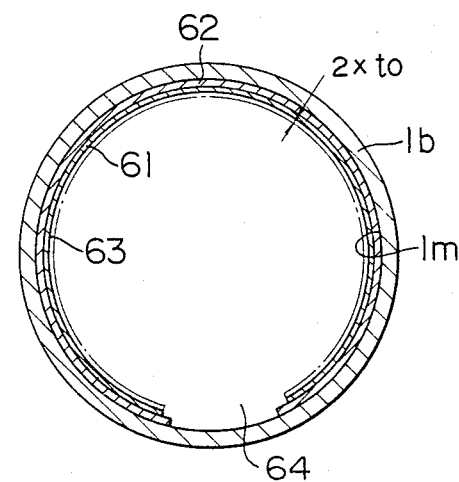
FIG. 10 is a horizontal sectional view in which the sealed container is lined with the wire mesh member of FIG. 9.

FIGS. 9 and 10 show a further example of the wire mesh member, in which a thin plate member is provided on the rear side of the wire mesh member for improvement of the rigidity of the wire mesh member and of ease of construction.

According to the example of FIG. 9, the thin plate member 62 is formed in a rectangular shape of substantially the same area as that of the rectangular wire mesh member 61 to line the latter, and both members are united with each other to be rolled in a cylindrical shape. Both members are then secured to the inner wall 1m of the shell portion 1b of the sealed container with such fixing means as spot-welding. Further, as shown by a dotted chain line 63 in FIG. 10, another wire mesh member 63 is provided over the wire mesh member 61 to line the inner wall of the sealed contaienr over again for further enhancing the oil separating function of the wire mesh member. In this way, it is possible to line the shell portion 1b with rectangular wire mesh members in layers on its inner wall surface 1m.

A space 64 between both longitudinal ends of the wire mesh members is provided for positioning a tube which serves as a guide for a gas introducing passageway (not shown). Also, when there is a projecting portion on the inner wall surface 1m, the corresponding position of the wire mesh member may be cut off. The thickness of one wire mesh member is designated by $t_0$.

Figure 11:
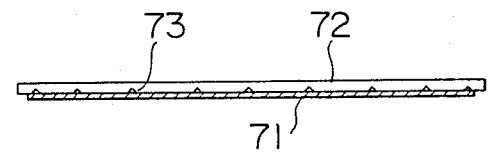
FIG. 11 shows still another example of a wire mesh member and is a developed size view of the wire mesh member which comprises a thin plate member provided with grooves.
Figure 12:
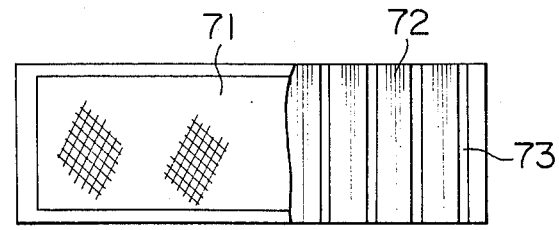
FIG. 12 is a bottom view of the wire mesh member of FIG. 11.
Figure 13:
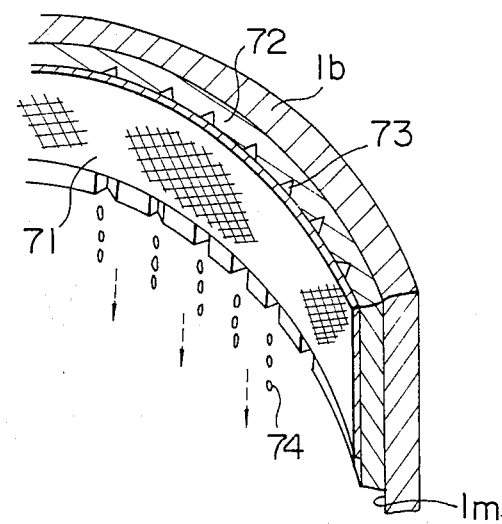
FIG. 13 is a partial perspective view in which the sealed container is lined with the wire mesh member of FIG. 11.

FIGS. 11 to 13 show an example of the wire mesh member in which groove portions for oil passages are formed in the lining member. There are provided a plurality of axially extending grooves 73 in the wall surface of a thin plate member 72 with which a rectangular wire mesh member 71 is in contact. The above grooves 73 constitute oil passages for more smoothly flowing the oil captured on the wire mesh member 71 downwardly, and reference numeral 74 designates oil drops falling along the inner wall 1m of the shell portion 1b.

Figure 14:
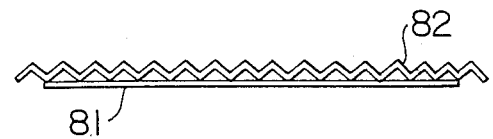
FIG. 14 shows still another example of a wire mesh member usable in the invention and is a developed side view of the wire mesh member which comprises a corrugated thin plate member.
Figure 15:
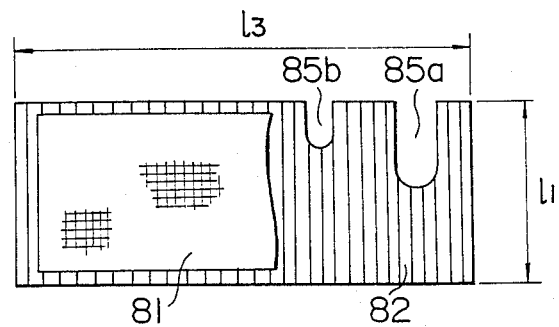
FIG. 15 is a bottom view of the wire mesh member of FIG. 14.
Figure 16:
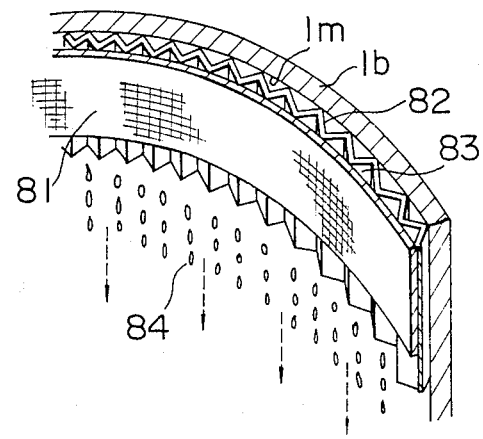
FIG. 16 is a partial perspective view in which the sealed container is lined with the wire mesh member of FIG. 14.

FIGS. 14 to 16 show still another example of the wire mesh member, in which a thin plate member 82 is formed in such a corrugating configuration as continuously defining V-shaped grooves 83 for positively ensuring axial oil passages. A wire mesh member 81 is joined with this corrugated thin plate member 82 on its one side. The circumferential length $l_3$ of the thin plate member 82 substantially corresponds to the inner peripheral length of the inner wall surface $1m$ of the sealed container. Further, a portion 85a of the meshmember is notched for engagement with a hermetic terminal portion and another portion 85b is notched for engagement with a discharge pipe. In this way, some notches may appropriately be provided so as to engage projecting parts on the inner wall surface $1m$ of the shell portion $1b$. Reference numeral 84 designates descending oil drops.

Figure 17:
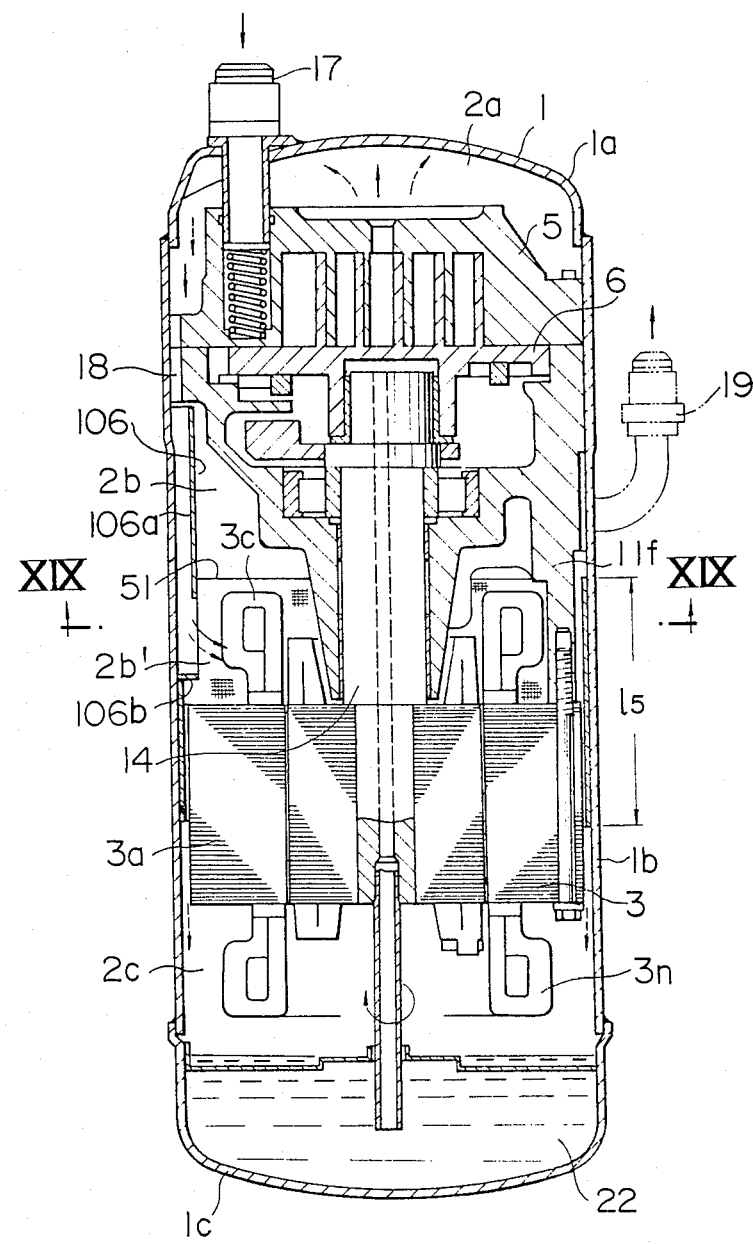
FIG. 17 is a vertical sectional view of a sealed type scroll compressor according to another embodiment of the invention.

FIG. 17 shows another embodiment of the invention, in which a frame plate 106a having a U-shaped cross-section is mounted on the side wall $1m$ of the sealed container. Refrigerant gas from the discharge chamber 2a is introduced through a guide passageway 106 defined by this frame plate and the container side wall $1m$ into the motor chamber 2b. Further, a collision plate 106b is provided in the passageway 106 for changing the flow direction of the discharge gas so that it flows toward the outside of the upper coil end portion 3c of the motor 3. In this embodiment, these passageway 106 and plate 106b cooperates with the woven wire mesh member which has been described with respect to the first embodiment.

Figure 18:
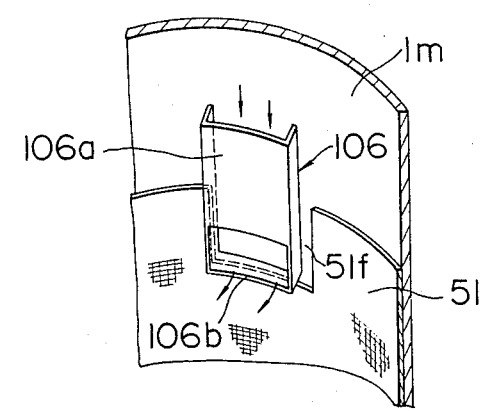
FIG. 18 is a partial perspective view of a guide passage portion in the embodiment of FIG. 17.

The above guide passageway 106 includes the gas-guiding plate 106a for introducing the gas downwardly and the collision plate 106b for introducing the flow of the refrigerant gas to the outside of the coil end portion 3c as shown in detail in FIG. 18.

The woven wire mesh member 51 is lined extending from an inner wall portion of the shell portion $1b$ which corresonds to the vicinity of the upper end of the upper coil end 3c in the motor 3 to another inner wall portion in proximity to a central portion in the stator outer periphery of the motor 3. The axial length of the woven wire mesh member 51 is indicated as $l_5$ in the drawing.

As seen in FIG. 17, the woven wire mesh member 51 is disposed at the position where it faces the outer periphery of the upper coil end portion 3c of the motor 3, so that the oil in the refrigerant gas is captured in this space $2b'$ therebetween. The oil adhering to the woven wire mesh member 51 at this part thereof is introduced downwardly along the woven wire mesh member 51 which is lined on the container shell portion opposite to the motor stator section 3a. It is preferable to make the wire mesh member having the length $l_5$ extending to the vicinity of the center position of the motor stator section, as shown in FIG. 17, in order to smoothly effect the oil dropping function in the narrow gap around the stator outer periphery. The lining of the woven wire mesh member improves the stickability of the oil to the wall surface, thereby increasing the flow resistance of the passage when the oil flows out of the compressor. This results in an effect of restraining the oil blowing-up phenomenon caused by the refrigerant gas in the motor chamber $2b(2b')$.

FIG. 18 is a view showing an example of attachment of the guide passageway 106. In this case, there is provided a notch $51f$ in the woven wire mesh member 51 at a portion thereof intersecting the guide passageway 106.

Figure 19:
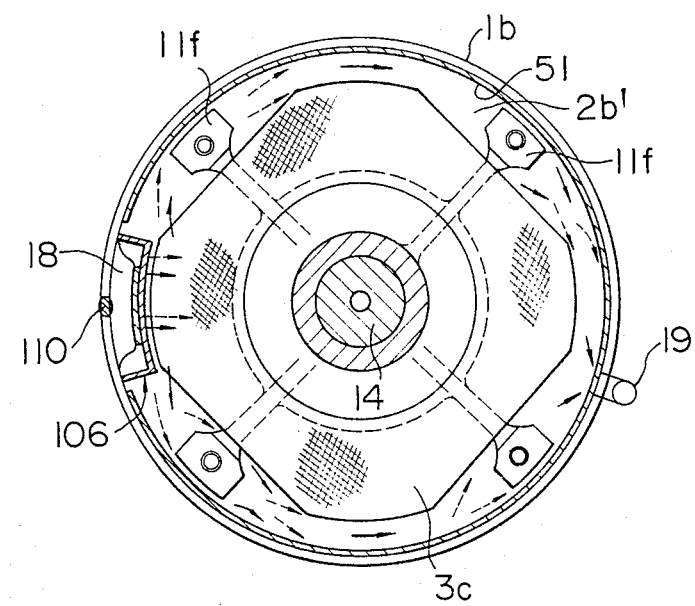
FIG. 19 is a cross-sectional view taken along the XIX—XIX line of FIG. 17.

FIG. 19 is a cross-sectional view taken along the XIX—XIX line of FIG. 17 and shows the flowing conditions of the refrigerant gas and oil in the vicinity of the motor 3. As in the drawing, all the refrigerant gas passing through the guide passageway 106 is discharged to the coil end portion 3c of the motor 3 which is opposite to the guide passageway 106. Then, the refrigerant gas is divided into two parts and flows circumferentially along the inner wall surface $1m$ of the sealed container $1b$. In other words, the woven wire mesh member is lined along the circumferential flow of the gas. In this embodiment, the gas in the container is urged to flow circumferentially along the container side wall by means of the above guide passageway 106, in order to accelerate the oil separating function in the outer peripheral space $2b'$ of the motor coil end portion 3c. The oil in the refrigerant gas sticks to both the woven wire mesh member 51 and the outer surface of the coil end portion 3c in this process of flowing of the gas.

Figure 20:
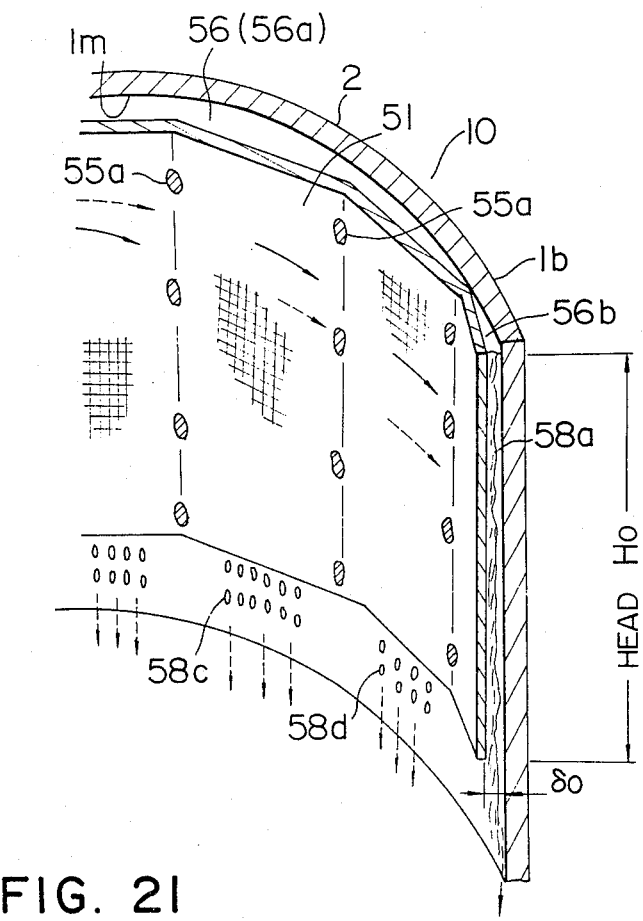
FIG. 20 is an explanatory view showing a flowing condition of oil in the embodiment of FIG. 17.

FIG. 20 is an explanatory view for showing the condition under which the oil sticking or adhering to the woven wire mesh member 51 flows. Though the container is lined on the inner surface of the side wall thereof with the woven wire mesh member, there actually exists a narrow gap 56 therebetween (for example, $S_0 \approx 0.2$–$0.4$ mm). More specifically, the narrow gap 56 is made between the woven wire mesh member 51 and the inner wall surface $1m$ of the shell portion except portions 55a of the woven wire mesh member 51 at which it is fixed to the inner wall surface $1m$ of the shell portion $1b$.

The gap 56 (56a, 56b) is provided for retaining therein, the oil 58a sticking to the wire mesh member. Thus, the space between the rear surface of the woven wire mesh member 51 and the inner wall surface $1m$ of the container shell portion is filled with the oil to provide a head $H_0$ between the oils in axial opposite ends of the woven wire mesh member, so that the falling function of the oil by its own weight can be effected more smoothly.

In the case where the wire mesh member is not provided, the oil flows discontinuously along the wall surface in the form of oil drops 58c, 58d.

Additionally, a spot-welding method is suitable for fixing the woven wire mesh member 51. The reference numeral 55a designates the portions fixed by the above welding method.

Figure 21:
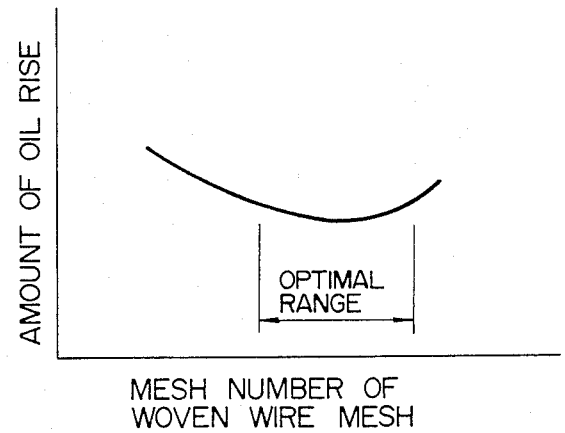
FIG. 21 is a diagram showing a relation between the mesh number of a wire mesh member used in the invention and the oil rising amount.

The inventors have confirmed experimentally that from the viewpoint of oil separation there exists an optimal range of the mesh number of the woven wire mesh member, as shown in FIG. 21.

Further, though the thickness $t_0$ of the woven wire mesh member 51 is exaggeratedly illustrated as being thicker than that for practical use in order to facilitate the explanation, it is preferable to form the wire mesh member having a thickness of approximately 0.2–1.0 mm. Also, though the size of the mesh of the woven wire mesh member 51 depends on the size of the oil drops in the container space, the range from 50 to 200 meshes is practically adequate.

What is claimed is:

1. A sealed type scroll compressor comprising a scroll compressor section, an electric motor, a shaft interconnecting the compressor section and the electric motor, a frame supporting the shaft, a sealed container for receiving therein the compressor section, electric motor, shaft and the frame, the frame being disposed to partition an interior of the sealed container into an upper and a lower chamber, an oil storage defined at a bottom of the lower chamber in the sealed container, the compressor section including an orbiting scroll member, a stationary scroll member and a suction and a discharge port for a gas, the orbiting scroll member and the stationary scroll member arranged with respect to each other to define compression spaces therebetween, the orbiting scroll member being arranged to move in orbiting motion relatively to the stationary scroll member without rotation about an axis of the orbiting scroll member so as to supply an oil in the oil storage into respective sliding portions of the compressor and to draw the gas from the suction port into the compression spaces, move the compression saces to a center of the member while decreasing the spaces to a center of the member while decreasing the spaces in volume for compressing the drawn gas and discharge the thus compressed gas through the discharge port into the upper chamber, passage means communicating the upper chamber with the lower chamber to introduce the discharged gas, into the lower chamber and a discharge pipe for discharging the compressed gas from the lower chamber out of the compressor, wherein a band-like wire mesh member of a fine mesh is provided in the sealed container to be annularly lined on an inner wall of the lower chamber, and the wire mesh member is of a sufficient length for extending axially from a lower end of the frame on an upper side of the electric motor through a small gap between the sealed container and an outer peripheral portion of the motor stator to separate the oil from the gas and smoothly pass the oil through the small gap into the oil storage in the lower chamber of the sealed container.

2. A sealed type scroll compressor according to claim 1, wherein said wire mesh member is formed of a woven wire mesh.

3. A sealed type scroll compressor according to claim 2, wherein said woven wire mesh is lined on the inner wall of the sealed container with a peripheral portion of the member fixed thereto by means of a spot-welding.

4. A sealed type scroll compressor according to claim 3, wherein said woven wire mesh is seam-welded at a periheral portion thereof by a narrow width and is fixed to the inner wall at positions in vicinity to the seam-welded peripheral portion by means of a spot-welding.

5. A sealed type scroll compressor according to claim 3, wherein said woven wire mesh is folded at a peripheral portion thereof to a rear side by a narrow width, and the woven wire mesh is fixed by means of a spot-welding with the folded portion disposed to face to the inner wall of the sealed container.

6. A sealed type scroll compressor according to claim 1, wherein said wire mesh member is formed of a mesh within a range from 20 to 150 meshes.

7. A sealed type scroll compressor according to claim 6, wherein said wire mesh member is formed from a wire having a diameter from 0.1 mm to 0.5 mm.

8. A sealed type scroll compressor according to claim 1, wherein said wire mesh member is formed by overlapping a plurality of wire mesh members.

9. A sealed type scroll compressor according to claim 1, wherein said wire mesh member is lined on a rear surface thereof with a thin plate member.

10. A sealed type scroll compressor according to claim 9, wherein said thin plate member is provided with axial grooves in a surface thereof on a side contacting with the wire mesh member.

11. A sealed type scroll compressor according to claim 9, wherein said thin plate member is formed of a corrugated plate member including axially extending concaved and convexed portions.

12. A sealed scroll compressor according to claim 2, wherein said wire mesh member is formed of a mesh within a range from 20 to 150 meshes.

13. A sealed type scroll compressor according to claim 12, wherein said wire mesh member is formed from a wire having a diameter from 0.1 mm to 0.5 mm.

14. A sealed type scroll compressor according to claim 2, wherein said wire mesh member is lined on a rear surface thereof with a thin plate member.

15. A sealed type scroll compressor according to claim 14, wherein said thin plate member is provided with axial grooves in a surface thereof on a side contacting with the wire mesh member.

16. A sealed type scroll compressor comprising a scroll compressor section, an electric motor, a shaft interconnecting the compressor section and the electric motor, a frame supporting the shaft, a sealed container for receiving therein the compressor section, electric motor, shaft and the frame, the frame being disposed to partition an interior of the sealed container into an upper and a lower chamber, gas passage means provided axially at an outer periphery of the frame for communicating the upper chamber with the lower chamber, a guide passage plate provided at a lower portion of the gas passage means and having a collision plate, a band-like wire mesh member provided in the sealed container to be annularly lined on an inner wall of the lower chamber, the wire mesh member being of a sufficient length for extending axially from a lower end of the frame on an upper side of the electric motor through a small gap between the sealed container and an outer peripheral portion of the motor stator, an oil storage defined at a bottom of the lower chamber in the sealed container, the compressor section including an orbiting scroll member, a stationary scroll member and a suction and a discharge port for a gas, the orbiting scroll member and the stationary scroll member engaging with each other to define compression spaces therebetween, the orbiting scroll member being arranged to be movable in orbiting motion relatively to the stationary scroll member without rotation about an own axis of the orbiting scroll member so as to supply an oil in the oil storage into respective sliding portions of the compressor and to draw the gas from the suction port into the compression spaces, move the compression spaces to a center of the member while decreasing the spaces in volume for compressing the drawn gas, and discharge the thus compressed gas through the discharge port into the upper chamber from where the compressed gas is introduced into the lower chamber through the gas passage means while the oil is separated from the gas by means of the wire mesh member and smoothly passed through the small gap into the oil storage in the lower chamber of the sealed container, and a discharge pipe for discharging the compressed gas from the lower chamber out of the compressor.

* * * * *